A. A. VARDELL, DEC'D.
H. G. VARDELL, EXECUTRIX.
HULLER.
APPLICATION FILED APR. 23, 1917.
1,362,973.
Patented Dec. 21, 1920.
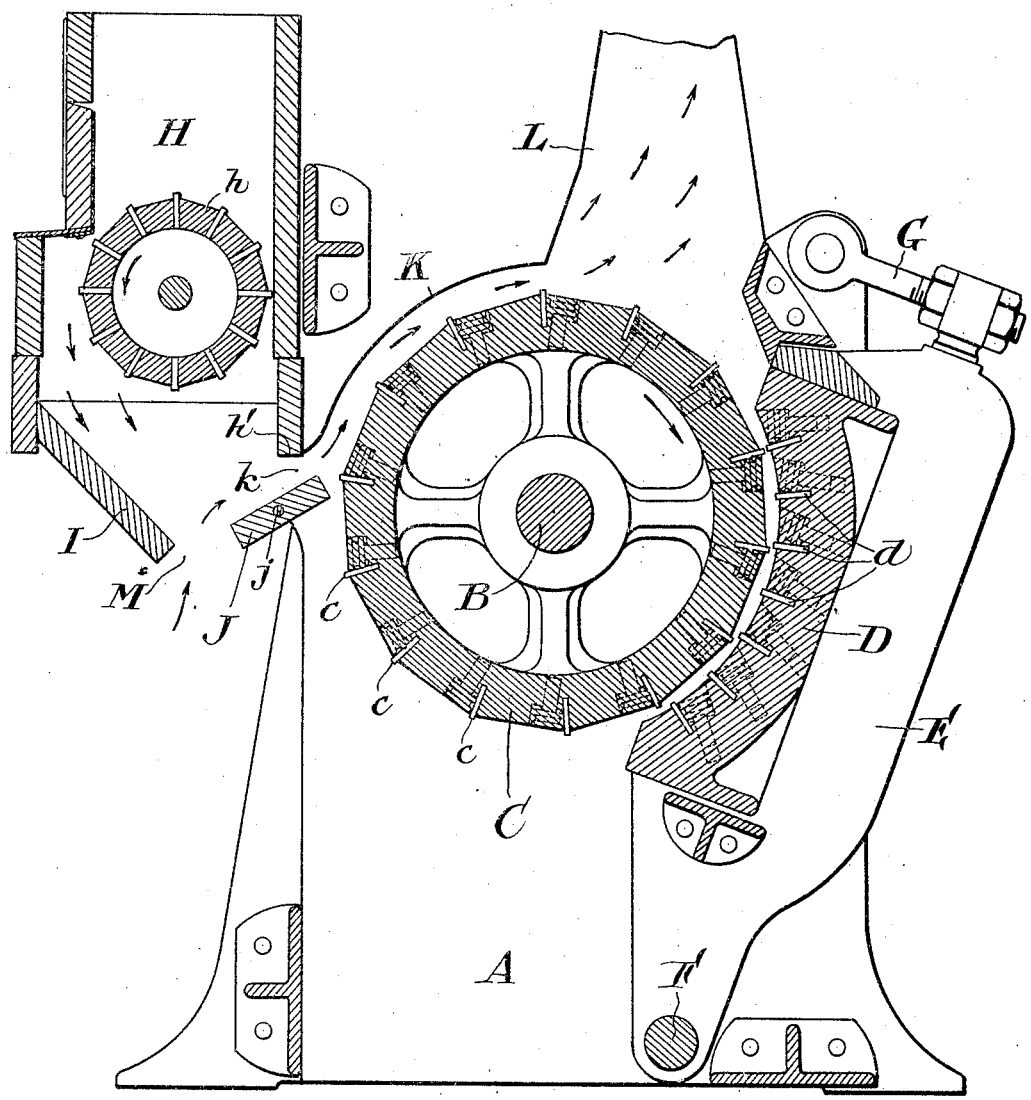
Inventor:
Arthur A. Vardell,
by Roberts, Roberts & Cushman
Attorneys

UNITED STATES PATENT OFFICE.

ARTHUR A. VARDELL, OF DALLAS, TEXAS; HIGHLAND GEE VARDELL EXECUTRIX OF SAID ARTHUR A. VARDELL, DECEASED.

HULLER.

1,362,973.   Specification of Letters Patent.   Patented Dec. 21, 1920.

Application filed April 23, 1917. Serial No. 163,769.

*To all whom it may concern:*

Be it known that I, ARTHUR A. VARDELL, a citizen of the United States, and resident of Dallas, in the county of Dallas and State of Texas, have invented new and useful Improvements in Hullers, of which the following is a specification.

This invention relates to hullers for removing hulls or shells from seeds or other similar products having shells, such as cotton seeds, peanuts, etc. As the invention is of especial utility in hullers for cotton seeds I will for the purpose of illustration describe an embodiment of the invention in a cotton seed huller. It is to be understood, however, that a cotton seed huller is only one example of many adaptations of the invention and is used merely by way of illustration.

Hullers of the type known as cylinder and bar hullers comprise a rotary cylinder provided with a series of longitudinally extending knives or blades, and a concave positioned close to the periphery of the cylinder, also provided with a series of longitudinally extending knives or blades. The cotton seed or other material to be hulled is fed in from a feeding device on top of the huller directly on to the cylinder and is carried by the rapidly rotating cylinder to the narrow space between the cylinder and concave where the hulling takes place.

In case any hard foreign material, such as pieces of metal, stones, etc., which may be mixed with the material to be hulled, is fed down into the huller and forced between the cylinder and concave, the machine is inevitably damaged and sometimes wrecked. Various devices have been proposed to protect the machine from damage, such as supporting a pivoted concave in position by a relatively fragile member which will break and permit the concave to open if a hard substance is jammed between the cylinder and concave, or providing the casing with a hinged shutter through which heavy material upon striking the cylinder may be projected out of the machine. In machines provided with the breakable supporting member for the concave, even though this member breaks and operates satisfactorily, all of the material has to enter between the cylinder and concave, and should any of the material be too large to pass through the space afforded by the opening of the concave the machine will still be damaged. When spring shutters are used it depends upon the weight of the material and where it strikes the shutter as to whether the shutter will open or not. Such contrivances, moreover, are dependent upon getting rid of the objectionable material after it has entered the huller and have attained only indifferent success. One of the principal objects of my invention is to provide a safety feeding device which will prevent material which is heavy and hard enough to be dangerous from ever coming into the machine. Other features of the invention will hereinafter be described and particularly pointed out in the claims.

The accompanying drawing consisting of a single figure, shows a vertical section of a cotton seed huller and feeder embodying one form of the invention.

The huller may be a cylinder huller of any desired type, and as herein shown comprises a frame having two vertical sides A, provided with suitable bearings in which the shaft B is mounted, carrying the cylinder C. The cylinder is provided with a series of knives or blades $c$ arranged about the periphery and secured in place in any well known or preferred manner. D is the concave, provided with a similar series of knives or blades $d$, and carried by a frame E which may be pivoted to the side frames A by shaft F, and supported in operative position by a bar or link G connecting the top of the frame E and the machine frame A. The machine as thus far described may be of any usual or preferred type.

Instead of placing the feeder directly over the cylinder as heretofore so that the material to be hulled is fed directly into the huller on top of the cylinder, the feeder H, with its feed roll $h$, according to my invention, is offset or placed back of the cylinder as shown in the drawing. At the bottom of the feeder chute is an inclined deflector I at the side opposite the cylinder, and at the side adjacent to the cylinder is a combined seed board and valve J pivoted to the machine at $j$, leaving between them a delivery passage open throughout its width at M. The position of the pivot $j$ and the weight of the board J at either side of the pivot are such that the board J is nearly balanced, but the left hand part as viewed in the drawing slightly overbalances the right hand part so that the board J will drop if the machine stops, but while the machine is running the air current, presently to be described, will normally hold the valve board J in the position shown with an open passage k into the huller between the tilting board and the lower edge of the feeder chute. The edge of the board J when in the position shown just clears the cylinder knives c.

A shield or cover K, preferably of sheet metal, extends from the lower edge h' of the feeder chute about half way over the cylinder. The cover K follows the contour of the cylinder and is spaced therefrom approximately an inch to form a narrow air passage. This air passage opens into a flue or hood L, which rises from the end of cover K and the machine frame at the forward side of the cylinder. The flue L is of such dimensions as to provide a free exhaust for the air.

In operation the cylinder C, revolving in the direction of the arrow, with its projecting blades c, at a high rate of speed, creates a blast or draft of air which enters at the opening k passes through the space between the cylinder and the cover K, and out through the flue L. The cotton seed or other material to be hulled is fed downward by roller h through the feeder H as indicated by arrows and falls on the deflecting board I. The air current generated by the rotating cylinder enters from below the feeder through the opening M between the deflector I and tilting seed board J, and thence passes into the huller through the opening k. The material passes down the deflector I, and upon reaching the opening M encounters the incoming air current passing therethrough and the lighter material (cotton seed or other material to be hulled) is caught by the air current and carried thereby into the huller, around the cylinder and between the cylinder and concave where the hulling is performed. Any heavier materials such as pieces of stone, metal, etc., which frequently become mixed with the seed, but which are not substantially influenced by the air current, either fall directly through the opening M or strike against the lower part of the nearly balanced seed board J, causing the same to tilt and allow the material to fall through by gravity. As the feeder is offset from the huller, the separated substances will be discharged outside of and clear of the huller. The tilting of the board J swings its upper edge against the lower edge h' of the feeder chute, thus momentarily acting as a valve to close the air passage k, whereupon the suction caused by the rotation of the cylinder acting upon the valve J will immediately open it again and continue to draw the seed into the huller. Opening M being free to the atmosphere, the current flowing into it is equally strong at any point of the width of the machine in the direction of the axis B of the cylinder C, and this arrangement avoids any danger of a current so weak at one point as to permit the seeds to be hulled to fall out of the opening, or so strong at another point as to prevent the heavier stones or metals desired to be removed from falling out.

As the seed or other material, from which the heavy and hard foreign substances have now been separated out, pass under the area of the hood or flue L on the way to the concave, the lightest and finest particles of lint, trash and dust, which come in with seed or which are formed by the attrition of the material striking against the cylinder and other parts, pass out with the air current through the exhaust flue L. It will be understood that the cross sectional area of the flue L is enough larger than the cross sectional area of the intake air passages to produce only a relatively gentle draft through flue L, of insufficient strength to carry away the seeds or similar substances which are to be hulled.

Thus foreign substances of a character to endanger the machine are separated out before the material enters the huller; the material is then carried into the huller by the air current created by the rotation of the cylinder; and the very light dust, lint and similar matter, is carried away by the air current before the material to be hulled is carried between the cylinder and concave.

I claim:

1. In combination, a huller, a feeder offset from the huller, means to create an air current from the delivery end of the feeder into the huller to carry the material to be hulled into the huller, and a free opening throughout the bottom of the delivery passage from the feeder to permit substances too heavy to be carried by the air current to be discharged by gravity outside of the huller before said material enters the huller.

2. In combination, a cylinder huller, a feeder therefor having a delivery passage open at the bottom throughout its width, an air passage leading laterally from the delivery end of the feeder into the huller, a rotary cylinder in the huller adapted to create a current of air upwardly and evenly throughout said opening and through said air passage to carry the material to be hulled into the huller, whereby to permit the separation and discharge by gravity of substances occurring in any part of the incoming stream of the material and too heavy to be carried by the air current, before the material enters the huller.

3. In combination, a cylinder huller, a feeder offset from the huller, an air passage leading from the delivery end of the feeder into the huller, a rotary cylinder in the huller adapted to create a current of air through said air passage to carry material to be hulled into the huller, and means to permit substances too heavy to be carried by the air current to be discharged from the machine by gravity before said material enters the huller.

4. A huller having therein in combination, a feeder offset from the huller having at its bottom a downwardly inclined deflector at the side opposite the huller defining an opening adjacent to the deflector throughout the axial width of the huller, and means to create a current of air inward through said opening and thence into the huller, adapted to carry the material to be hulled into the huller and to permit substances too heavy to be carried by the air current to be discharged by gravity through said opening outside of the huller.

5. A huller comprising a rotary cylinder and having therein a feeder offset from the huller at one side of the axis of rotation having at its bottom a downwardly inclined deflector at the side opposite the huller, a free opening to the outer air adjacent to the deflector, a rotary cylinder in the huller being adapted to create a current of air inward through said opening and thence into the huller, whereby to carry the material to be hulled into the huller and to permit substances too heavy to be carried by the air current to be discharged by gravity through said opening outside of the huller.

6. A huller having therein in combination a feeder offset from the huller, a pivotally supported board at the bottom of the feeder, an air passage leading from the delivery end of the feeder above said board into the huller, and means to create a current of air through said air passage to carry material to be hulled into the huller, said board being adapted to swing downwardly when substances too heavy to be carried by the air current are delivered thereon by the feeder.

7. A huller having therein in combination a feeder offset from the huller, a pivotally supported board at the bottom of the feeder, an air passage leading from the delivery end of the feeder above said board into the huller, and means to create a current of air through said air passage to carry material to be hulled into the huller, said board being adapted to be supported by the air current and to swing downwardly when the air current is interrupted or when substances too heavy to be carried by the air current are delivered thereon by the feeder.

8. In combination, a huller, a feeder offset therefrom, a pivotally supported and approximately balanced board at the bottom of the feeder, an air passage leading from the delivery end of the feeder above said board into the huller, said board being adapted to be tilted by substances too heavy to be carried by the air current induced by the operation of the huller, and being adapted when tilted both to drop said substances and to obstruct said air passage.

9. In combination, a huller, a feeder offset therefrom, a pivotally supported and approximately balanced board at the bottom of the feeder, an air passage leading from the delivery end of the feeder above said board into the huller, said board being adapted to be supported by the air current induced by the operation of the huller and to be tilted by interruption of the air current, or by substances too heavy to be carried by the air current, and being adapted when tilted both to drop said substances and to obstruct said air passage.

10. A huller having therein in combination, a feeder offset therefrom having at its bottom a downwardly inclined deflector at the side opposite the huller, a pivotally supported board at the bottom of the feeder at the side adjacent to the huller, said deflector and board being spaced apart to provide an air intake opening therebetween, an air passage leading from the delivery end of the feeder above said board into the huller, and means to create a current of air through said intake opening and air passage into the huller to carry the material to be hulled from the feeder into the huller.

11. In combination, a huller, a feeder offset therefrom having at its bottom a downwardly inclined deflector at the side opposite the huller, a pivotally supported board at the bottom of the feeder at the side adjacent to the huller, said deflector and board being spaced apart to provide an air intake opening therebetween, an air passage leading from the delivery end of the feeder above said board into the huller, and a rotary cylinder in the huller, adapted to create a current of air through said intake opening and air passage into the huller to carry the material to be hulled from the feeder into the huller.

12. A huller having therein in combination, a feeder offset therefrom, a pivotally supported board at the bottom of the feeder, an air passage leading from the delivery end of the feeder above said board into the huller, means to create a current of air through said air passage to carry material to be hulled into the huller, said board being adapted to swing downwardly when substances too heavy to be carried by the air current are delivered thereon by the feeder, and a downwardly inclined deflector at the bottom of the feeder opposite said pivoted board and spaced therefrom to form an air intake opening at the bottom of the feeder between the deflector and the pivoted board.

13. In combination, a huller, a feeder offset therefrom, a pivotally supported and approximately balanced board at the bottom of the feeder, an air passage leading from the delivery end of the feeder above said board into the huller, said board being adapted to be tilted by substances too heavy to be carried by the air current induced by the operation of the huller, and being adapted when tilted both to drop said substances and to obstruct said air passage, and a downwardly inclined deflector at the bottom of the feeder opposite said pivoted board and spaced therefrom to form an air intake opening at the bottom of the feeder between the deflector and the pivoted board.

14. In combination, a cylinder huller, a feeder offset through the huller having an air passage opening from the delivery end of the feeder into the huller, a rotary cylinder in the huller, and a cover extending at least part way over the cylinder at the side adjacent to the feeder forming with the cylinder a passage connecting with the passage opening from the delivery end of the feeder, the rotation of the cylinder being adapted to create a seed-delivering air current through the feeder into the huller and through said passages.

15. In combination, a cylinder huller, a feeder offset from the huller having an air passage opening from the delivery end of the feeder into the huller, a rotary cylinder in the huller, and a cover extending approximately half way over the cylinder at the side adjacent to the feeder forming with the cylinder a passage connecting with the passage opening from the delivery end of the feeder, and an exhaust stack above the other side of the cylinder communicating with the delivery end of the passage formed between the cylinder and cover, the rotation of the cylinder being adapted to create an air current from the feeder into the huller and through said passages and exhaust stack.

16. In combination, a cylinder huller, a feeder offset from the huller having at its bottom a downwardly inclined deflector at the side opposite the huller, a pivotally supported and approximately balanced board at the bottom of the feed adjacent to the huller, said deflector and board being spaced apart to provide an air intake opening therebetween, an air passage opening from the delivery end of the feeder above the pivoted board into the huller, a rotary cylinder in the huller, and a cover extending at least part way over the cylinder at the side adjacent to the feeder forming with the cylinder a passage connecting with the passage opening from the feeder, said rotary cylinder being adapted to create an air current through said intake opening and said passages.

17. In combination, a cylinder huller, a feeder offset from the huller having at its bottom a downwardly inclined deflector at the side opposite the huller, a pivotally supported and approximately balanced board at the bottom of the feed adjacent to the huller, said deflector and board being spaced apart to provide an air intake opening therebetween, an air passage opening from the delivery end of the feeder above the pivoted board into the huller, a rotary cylinder in the huller, a cover extending approximately half way over the cylinder at the side adjacent to the feeder forming with the cylinder a passage connecting with the passage opening from the delivery end of the feeder, and an exhaust stack of relatively large cross sectional area above the other side of the cylinder communicating with the delivery end of the passage formed between the cylinder and cover.

Signed by me at Dallas, Texas, this 17th day of April, 1917.

ARTHUR A. VARDELL.